United States Patent
daCosta et al.

(10) Patent No.: US 7,894,385 B1
(45) Date of Patent: Feb. 22, 2011

(54) MOBILITY EXTENSIONS FOR WIRELESS MULTIPLE RADIO MESH

(75) Inventors: Francis daCosta, Santa Clara, CA (US); Sriram Dayanandan, San Jose, CA (US)

(73) Assignee: Mesh Dynamics, Inc., Santa Clara, CA (US)

( * ) Notice: Subject to any disclaimer, the term of this patent is extended or adjusted under 35 U.S.C. 154(b) by 830 days.

(21) Appl. No.: 11/818,899

(22) Filed: Jun. 15, 2007

Related U.S. Application Data (60) Provisional application No. 60/815,217, filed on Jun. 19, 2006.

(51) Int. Cl.
*H04W 4/00* (2009.01)

(52) U.S. Cl. .................. 370/328; 370/406; 455/436; 455/437; 455/439

(58) Field of Classification Search ............... 370/328, 370/406; 455/436, 437, 439
See application file for complete search history.

(56) References Cited

U.S. PATENT DOCUMENTS

| | | | |
|---|---|---|---|
| 5,633,876 A * | 5/1997 | Dinkins | 370/315 |
| 7,164,667 B2 * | 1/2007 | Rayment et al. | 370/329 |
| 2004/0142657 A1 * | 7/2004 | Maeda | 455/11.1 |
| 2004/0264413 A1 * | 12/2004 | Kaidar et al. | 370/332 |
| 2005/0074019 A1 * | 4/2005 | Handforth et al. | 370/406 |
| 2005/0078632 A1 * | 4/2005 | Aramaki et al. | 370/331 |
| 2006/0077985 A1 * | 4/2006 | Erwin et al. | 370/400 |
| 2006/0166699 A1 * | 7/2006 | Aghvami et al. | 455/552.1 |

* cited by examiner

*Primary Examiner*—Dwayne D Bost
*Assistant Examiner*—Nimesh Patel
(74) *Attorney, Agent, or Firm*—Cherskov & Flaynik

(57) ABSTRACT

The functionality of multiple radio backhaul is extended to mobility applications. The multiple radio backhaul uses at least one radio for the uplink and at least one radio for the downlink, both operating in different, non-interfering channels. A mobile mesh node scans and/or samples multiple radio channels to determine the best parent mesh node to connect to. Techniques devised to scan/sample the external Radio Frequency (RF) environment without sacrificing the overall up time performance of the network are described.

3 Claims, 6 Drawing Sheets

Prior Art Mesh with
1-Radio Backhaul and
Separate Service Radio

Enhanced Mesh with
2-Radio Backhaul

MOBILITY EXTENSIONS FOR WIRELESS MULTIPLE RADIO MESH

CROSS REFERENCE TO OTHER APPLICATIONS

This application claims priority to U.S. Provisional Patent Application No. 60/815,217 entitled MOBILITY EXTENSIONS FOR WIRELESS MULTIPLE RADIO MESH filed Jun. 19, 2006 which is incorporated herein by reference for all purposes.

BACKGROUND OF THE INVENTION

Figure 1:
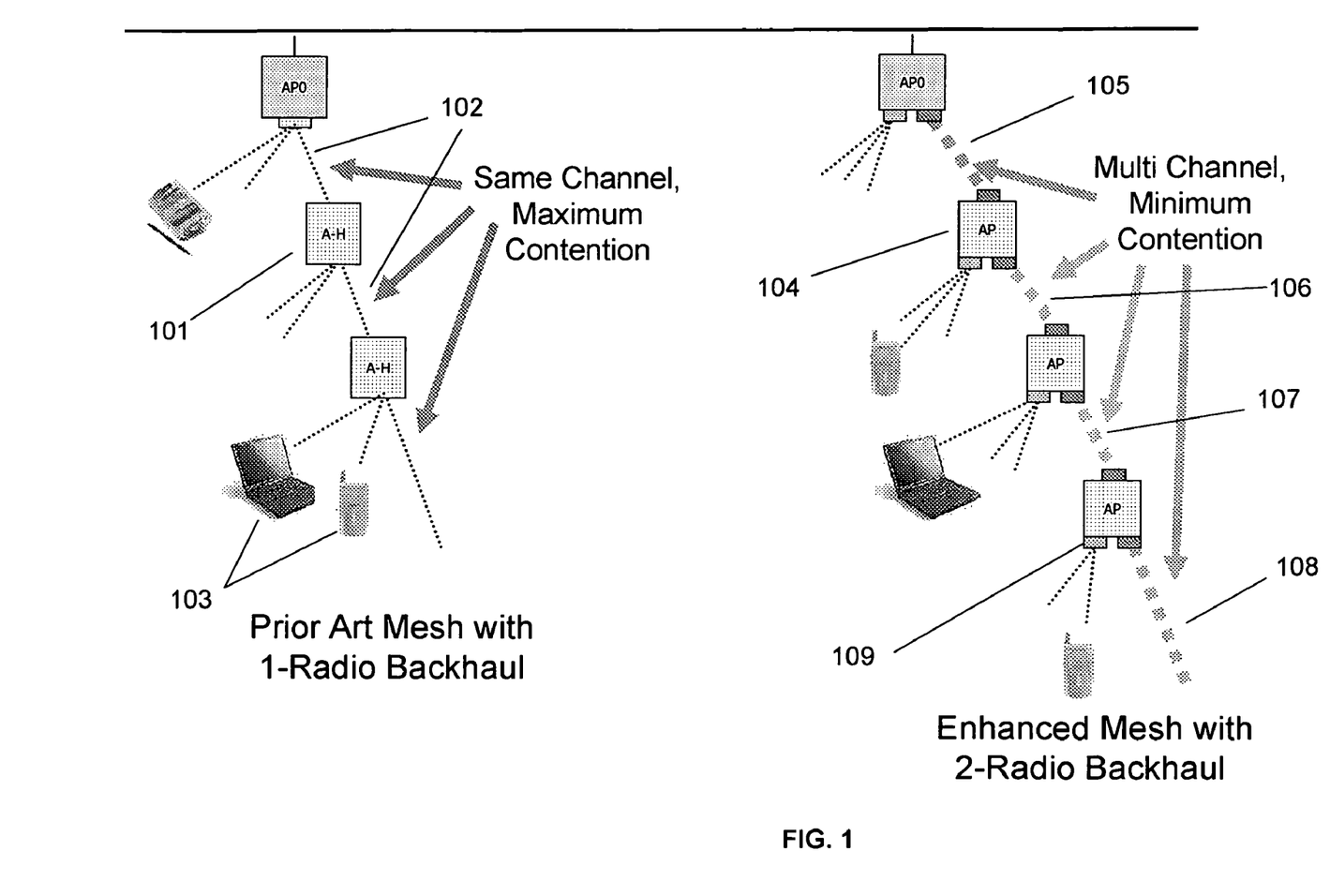
FIG. 1 illustrates the contention on a conventional 1-radio mesh compared with a mesh having a 2-radio backhaul path.
Figure 2:
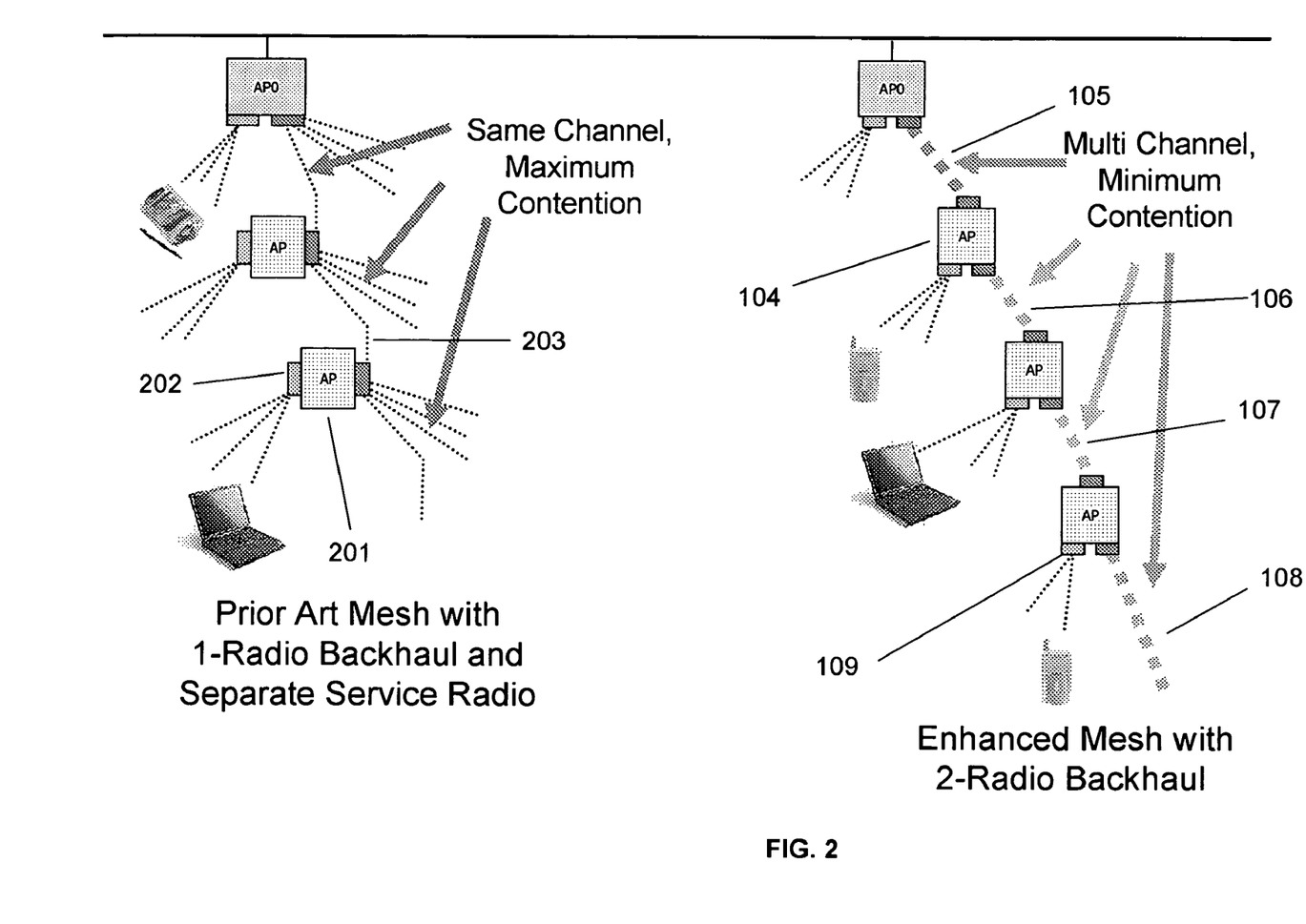
FIG. 2 illustrates the contention on a conventional "1+1" radio mesh compared with a mesh having a 2-radio backhaul path.

There is increasing interest in employing one network to support video, voice and data traffic. Currently, the video, voice and data networks are distinct since each addresses differing latency and bandwidth requirements. The challenge lies in providing within the same network the ability to address potentially conflicting latency and throughput needs of diverse applications. Some existing systems use multiple radio backhaul to provide both good throughput and latency without degradation over many hops or relays. Such systems sometimes use different non-interfering radio channels as shown in FIGS. 1 and 2 labeled 104 to 108. This configuration, however, complicates mobile extensions because a mobile mesh node (FIG. 3, label 301) needs to sample multiple RF channels to determine the best parent mesh node to connect to.

Figure 3:
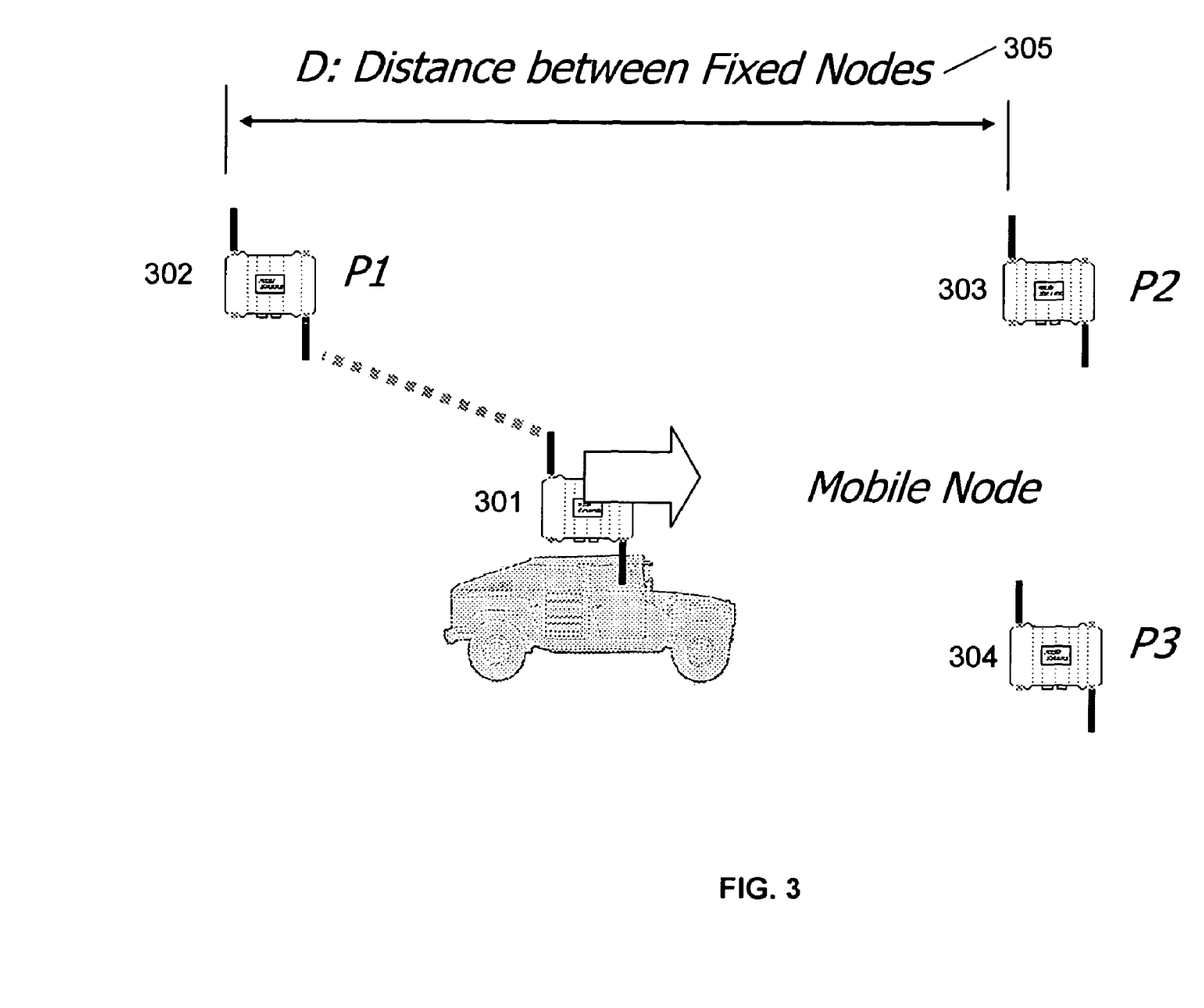
FIG. 3 shows a mobile mesh node 301 connected to parent mesh node 302 with two candidate parent 303, 304.

FIG. 3 shows two potential parent nodes P2 303 and P3 304. Mobile node 301 has a current connection to the downlink of P1 302. The downlink P2 and P3 are on different channels to avoid RF interference. Mobile node 301 must sample downlink channels of both P2 303 and P3 304 to measure throughput and decide whether to switch from its current parent node.

Software extensions to the multi-radio backhaul (shown in FIGS. 1, 2) enable mesh nodes to be mobile. A technique is described whereby mobile units scan the environment to locate the best parent node to connect to even though all mesh nodes are operating on different channels. The system performs the following:
1. Scanning to discover all parent mesh nodes in the vicinity.
2. Place list of potential parent nodes in a to-be-sampled list
3. Receive a token from current parent to commence sampling (packets buffered)
4. Sample downlink-uplink connectivity with a selection from sample list
5. Return to normal operation (no more buffering)
6. Continue in this mode till next sampling token is received from parent
7. Repeat with another parent from sample list
8. Repeat steps above till multiple samples have been got
9. Make a decision to stay or switch parents based on throughput, signal strength et al.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A mesh node with a multiple radio backhaul in a dynamic external Radio Frequency (RF) environment is described. The RF environment is dynamic due to either its motion or others. A mobile mesh node must therefore scan/sample multiple radio channels to determine the best parent mesh node to connect to. A technique of doing so without sacrificing the overall performance of the mobile mesh unit is described in this application. The techniques described are not limited to mobility. The same technique has also been employed to static mesh nodes operating in dynamic RF (radio frequency) environments.

Overview of Multi-Radio Backhaul

Radio is a shared medium where only one person can be "talking" at a time. As networks grow, performance degrades rapidly as the same AP services more clients. The AP's Basic Service Set (BSS) becomes unmanageable. The need to split up the network into smaller groups is essential to the health of a network.

For the 1-radio mesh, all of the backhaul links 102 are on the same channel (frequency) and therefore contend in the same spectrum. Since the backhaul function is performed by the same radios that service clients, there is contention between all clients and all backhaul links whenever devices and mesh APs are within range of one another. For latency sensitive transmissions, like VoIP, this situation creates the largest amount of latency and jitter since voice packets must contend again and again with voice packets in other service sets (at other mesh relay nodes) as they are relayed through the backhaul path, thereby compounding the contention and increasing latency/jitter along the way. In contrast to this, the preferred mesh with a multi-radio backhaul path uses different channels (frequencies) for different backhaul links. Thus, links 105, 106, 107, and 108 would all be on different channels and therefore are not contending with each other. Note that these backhaul links also use separate radios from the radios that service clients 109 and therefore client service transmissions do not contend with backhaul transmissions.

FIG. 2 shows an example of the preferred mesh with a 2-radio backhaul compared with a recent evolution of the 1-radio mesh. In FIG. 2, each node 201 has 2-radios, but one of these radios 202 has been dedicated to servicing clients while the other is dedicated to the backhaul link 203. Hence, this architecture is called a "1+1" mesh since the backhaul path still uses only one radio. The result is that while transmissions between clients and mesh nodes no longer contend with backhaul traffic, backhaul links still contend with each other.

FIGS. 1 and 2 indicate that the multiple radio backhaul shown on the right hand side of both these figures has some clear advantages over a single radio backhaul for both throughput and latency, since contention is contained by using different non interfering channels on the uplink and downlink radios on each mesh node. For Node 104, the uplink channel is shown as 105 and the downlink channel as 106.

Addressing Mobility with Multiple Radio Backhaul (Relay) Nodes

Addressing Mobility with Multiple Radio Backhaul (relay) nodes poses a problem for mobile mesh node 301, FIG. 3. In this example. The mesh node is connected to P1 302 but moving towards P2 303 and P3 304. It must sample throughput available from those potential parents and collect sufficient samples to make an informed decision between P2 and P3.

If the unit is moving it is constantly in new territory and does not know of the presence of P2 or P3 ahead of time. It cannot hear them: P2 and P3 downlinks are operating on non-interfering channels than P1 and its uplink is connected to node P1's downlink. It can therefore only hear P1's channel.

One alternative is to install a separate, dedicated radio, referred to as the scanning radio. This radio scans the RF environment and discovers potential parent nodes. These are then added to the list of potential parents to be sampled, in order to determine which provides better throughput, averaged over multiple time-delayed samples.

It could be argued that the scanning radio could also sample to decide the best next parent. That is an option but it reduces the amount of time scanning. Further, if the antennas on the uplink differ from those on the scanning radio, then the conclusions made by the scanning radio may be inaccurate. Lastly, this approach requires that all mobile nodes must have a scanning radio. However, scanning radios are needed only as part of a discovery process, when the mobile mesh node uplink is traveling into unfamiliar territory. It may not be needed if there are multiple uplink radios on the mobile unit each set to listen to a specific channel.

Buffering Packets and Sending Sampling Tokens

Packets to be sent down to it by its parent to a mesh node must be buffered when the node uplink is sampling the throughput performance from a candidate parent downlink, Likewise, packets coming into the mesh node from its downlink and intended to be transmitted upward to its parent must also be buffered till the mesh node's uplink switches back to its current parent's downlink channel and resumes normal operation.

Each parent may have multiple child nodes each requesting to sample other candidate parents. When they do so their packets must be buffered. One embodiment of this invention is to coordinate all these sampling times by having the parent node (P1 FIG. 3) send a token in a round robin manner to each of its children, periodically. The periodicity may be set by the beacon interval, for example, and the token may be sent with the beacon as an application specific information element (ASIE) to be used by the children mesh nodes to determine which child node is allowed to sample other potential parent nodes.

Figure 4:
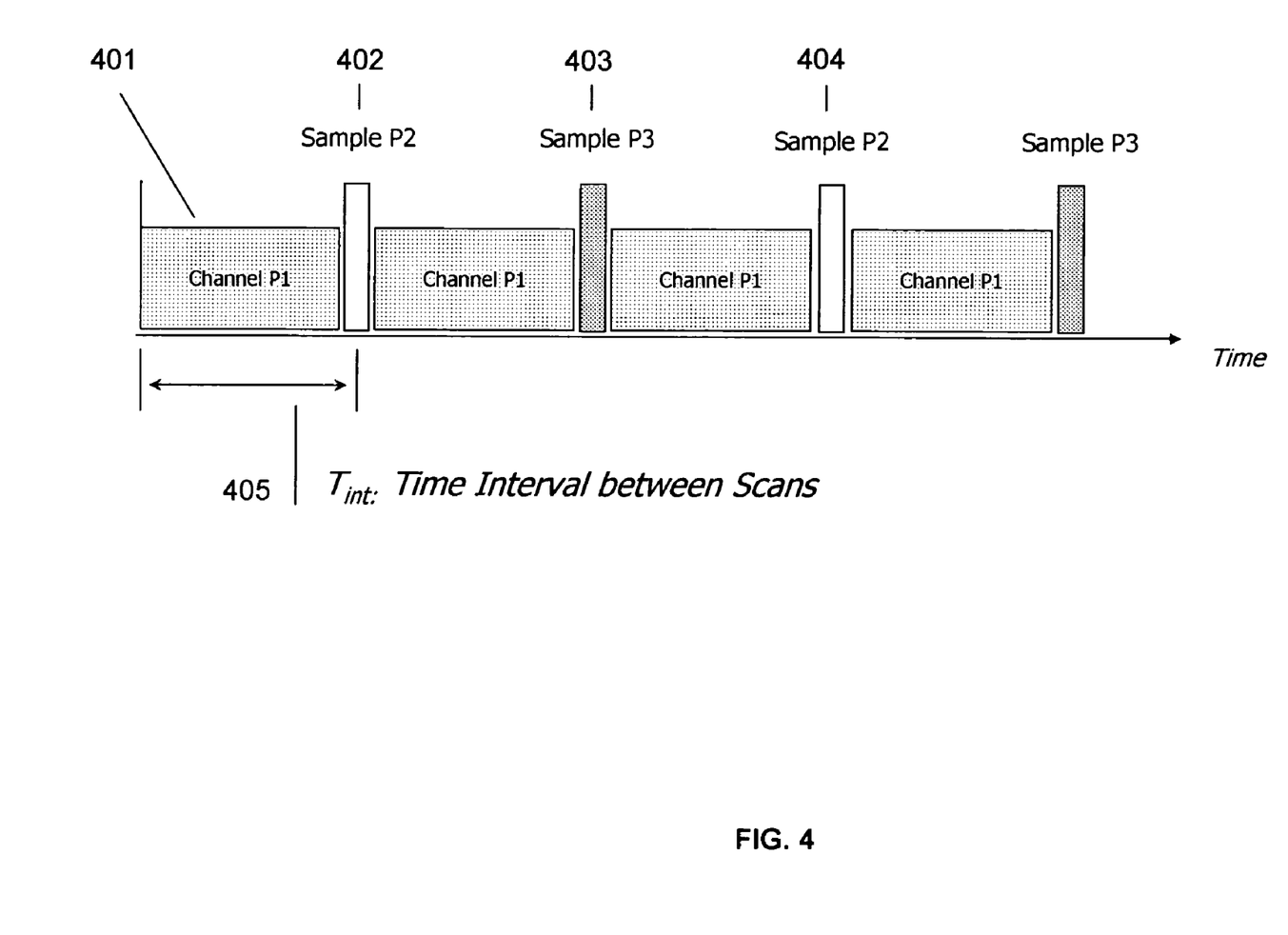
FIG. 4 graphically illustrates the timing chart where the mobile mesh node uplink samples the two candidate parents P2 303 and P3 304 periodically in round robin fashion. When the mesh node uplink is sampling, the parent node holds its packets—no packets are lost during sampling. The parent mesh node controls when to sample by sending a token to the child node. At that time it also knows it has to buffer the packets.

FIG. 4 graphically illustrates the timing chart where the mobile mesh node uplink samples the two candidate parents 303, 304 periodically in round robin fashion. When the mesh node uplink is sampling, the parent node holds its packets—no packets are lost during sampling. The parent mesh node controls when to sample by sending a token to the child node after a time interval FIG. 4, label 401. The time interval $T_{int}$ 401 could be set as multiple of the beacon interval and the token included as part of the beacon message.

When the token is received and acknowledged by the child node, the parent will begin holding packets for it till it returns from the sampling mode and resumes normal operation.

Note that in FIG. 3 parent mesh node P1 301 has one child. Had it multiple children each child would get a token S times the time interval, where S is the number of siblings the mobile mesh node has. In other words, the more children a parent has, the less frequently does each child get a token.

Sampling Process for Mobile Nodes

In summary, the software technique described in this application applies to both scanner equipped and non-scanner equipped mobile systems. The software performs the following:

1. Scanning to discover all parent mesh nodes in the vicinity (if needed)
2. Place list of potential parent nodes in a to-be-sampled list
3. Receive a token from current parent to commence sampling (packets buffered)
4. Sample downlink-uplink connectivity with a selection from sample list
5. Return to normal operation (no more buffering)
6. Continue in this mode till next sampling token is received from parent 7. Repeat with another parent from sample list
8. Repeat steps above till multiple samples have been got
9. Make a decision to stay with or switch parents Computing the Maximum Speed of Travel FIG. 4 shows the timing chart for the scenario in FIG. 3. Most of time is taken up performing the normal operation of moving data packets, label 401. The uplink of the mesh node is on P1's downlink for all 401 blocks of time. In this particular case, P1 302 has only one child shown: every beacon interval (or multiples of it) the child 301 may receive a sampling token.

Since it has two contending candidate parents the sampling sequence would flip between the two. 402, 403 sample P2 and P3 respectively and then back to P1 404. A minimum number of samples is needed to make an informed decision.

In general the maximum speed the mesh node can travel is a function of:
1. D The distance traveled before a switch is made see label 305
2. Tint The time between samples, see label 405
3. P The number of candidate parents e.g. P2+P3=2
4. Nmin Minimum number of samples to take before a switch is made.
5. Childs Number of children the parent mesh has to share tokens with.

In the worst case a switch should occur at least by the time the mobile node reaches the next node. Hence FIG. 3, 305 is depicts the worst case distance. The node spacing is dependant on the radio frequency band (e.g. 2.4 Ghz or 5.8 Ghz) and the type of antennas (e.g. omni directional vs. sectored.). The latter provide a more focused beam and hence more range. This fact is used in the dual uplink-downlink system shown in FIGS. 5,6.

If the number of samples to be taken—per parent—before making a decision is Nmin and the number of potential parents is P then the time elapsed to collect sufficient samples is:

$$T_{Time\ Elapsed} = Nmin * P * Tint * Childs \qquad \text{Equation 1}$$

The maximum speed of the mobile node is therefore $$\text{Maximum Speed} = D/(Nmin * P * Tint * Childs) \qquad \text{Equation II}$$

Example: if D=300 meters, Nmin=10 samples, P=2 candidates, Tint=0.25 seconds, Childs=1 then the maximum speed=150/(10*2*0.25)=60 meters/sec or 216 km per hr.

Note that the time intervals between receiving sampling tokens from the parent mesh node is dependent on both the number of siblings the mobile mesh node shares tokens with. The maximum speed is also dependent on the number of potential parents: the more potential parents, the slower the maximum speed. For fast moving mesh nodes, both P and Childs should be kept low. One such scenario is trains or a truck convoy moving string of pearls.

Extending Speed with Back-to-Back Sector Antennas

Figure 5:
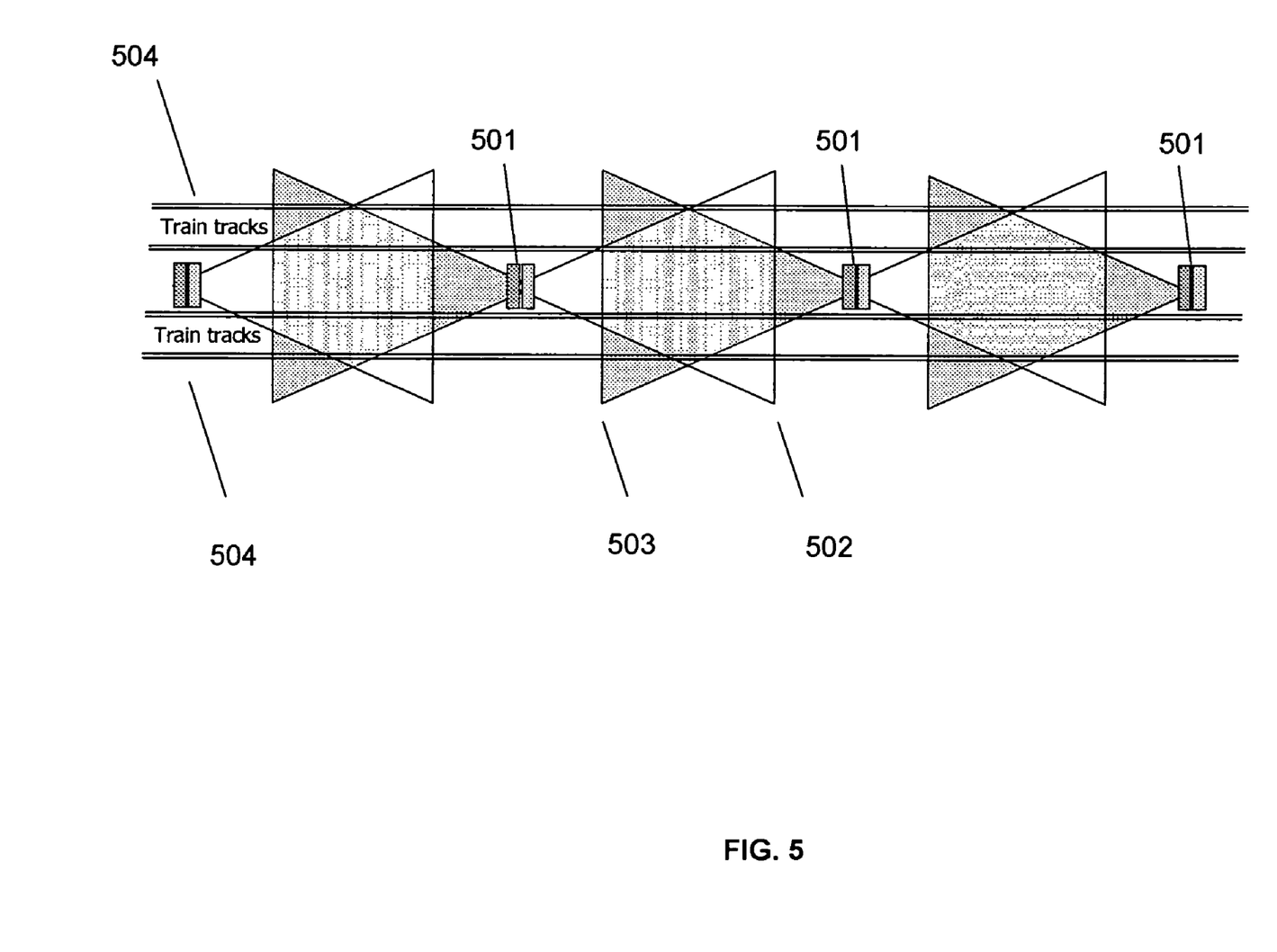
FIG. 5 shows a double downlink antenna configuration on fixed parent nodes 501 along a train track or other relatively linear path 504. The downlinks use sectored or panel antennas with 30-60 degrees angle mounted back to back and facing opposite directions 502, 503.

If the channels that the potential parent nodes use is fixed, then the scanning radio is no longer needed. This results in a simpler system for mobility applications as with trains or convoy trucks or mining trolleys as examples. As shown in FIG. 5, two panel antennas are mounted back to back, and connected to 2 separate radios. This doubles the RF energy and focuses the RF energy in one direction. The radios connected to the antennas are operating may even operate on interfering channels since the antenna coverage does not overlap.

FIG. 5 depicts the two panel antennas system mounted on fixed nodes 501 located between two tracks, 504. The fixed nodes 501 each have two sector antennas pointing in opposite directions 503, 502. They are mounted back to back and each is connected to a separate downlink radio for the mobile unit.

In addition to the two sectored service antennas to cover the tracks shown, each of the fixed nodes also has a sectored uplink and downlink backhaul radio, (not shown) that connect to each other to form a chain of relay mesh nodes. There are therefore a total of four radios on each fixed node, two as part of the fixed node backhaul and two "service" downlinks for the mobile units. This is equivalent to adding one more service radio 109 to the two backhaul radios shown as 105 and 106 in FIG. 1.

The service radios and backhaul radios in 105/106 and service radio 109 were on different frequency bands to avoid channel interference. The antennas were omni-directional, driven by the fact that uplink, downlink and service were all single radio systems. Multiple downlinks with sectored antennas reduces the cross interference and if there are sufficient channels (as in the IEEE 802.11a 5.8 GHz band) then all the radios can be of the same type. This simplifies the design of both fixed and mobile mesh nodes.

Figure 6:
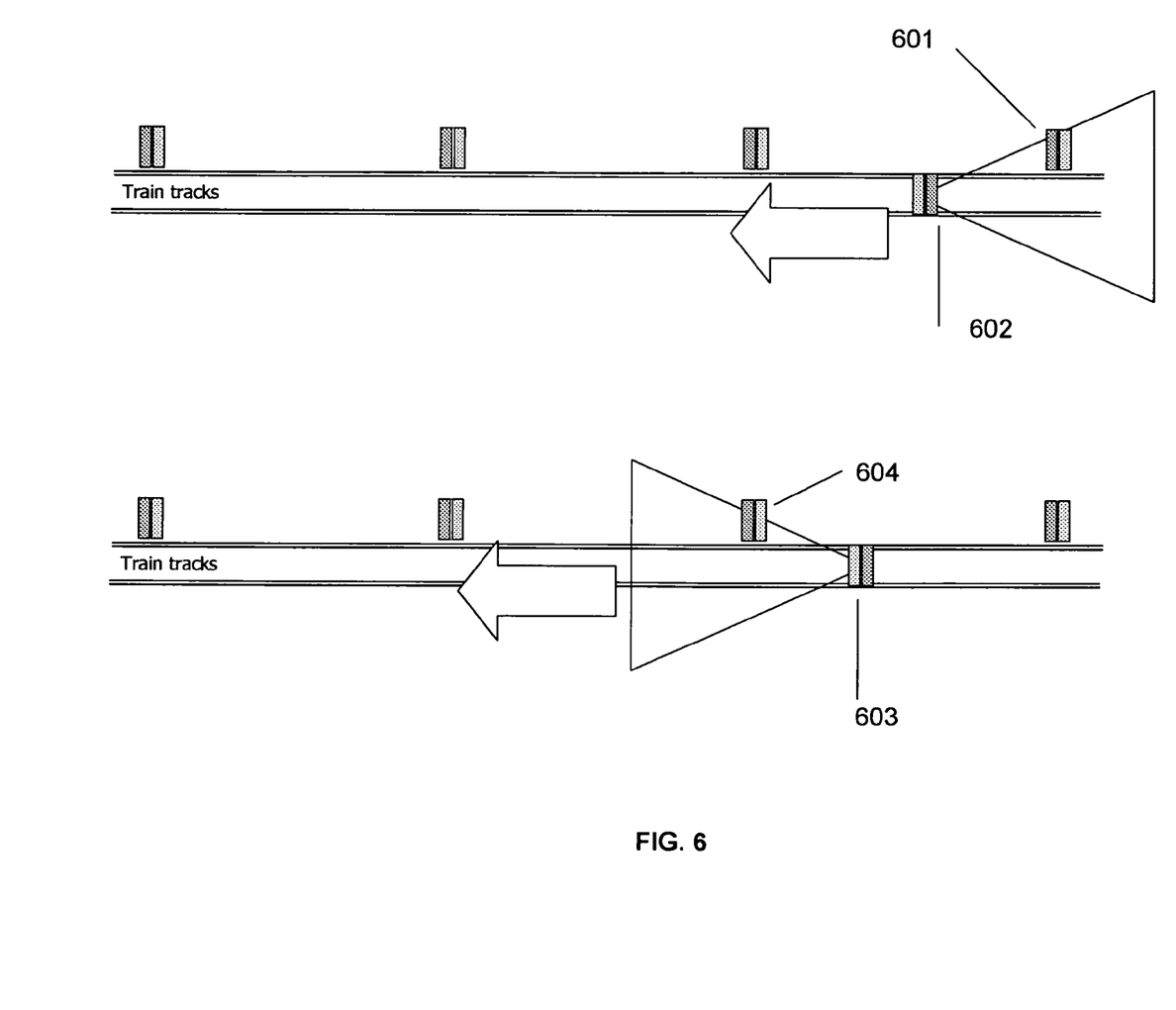
FIG. 6 shows a mobile unit with two uplinks, mounted back to back. A switch over from one antenna to the other is shown in two positions of the mobile unit. In the upper picture antenna 602 on the mobile unit is connected to 601 of the fixed node. In the picture below, the train has moved toward the left and the transmission from 603 on the mobile unit to downlink 604 of another parent node is better than from 601-602. A switch is made.

FIG. 6 depicts a mobile unit—also with back-to-back panel antennas switching over from one mesh node to another. In the upper section, antennas 601/602 are transmitting data packets while antenna 603 samples the throughput from 604. When the sampled throughput is better than that available from the 601/602 combination, a switch occurs. The connected link data now becomes 603/604 and 602 begins sampling for a better link.

Notice that in this approach there has to be two service downlinks on the fixed nodes and two uplinks on the mobile unit. There is also no scanner—the channels are fixed on the back to back antennas and the antennas on the mobile unit need sample only one channel. Hence there is no discovery and therefore no need for a scanning radio.

Field Tested Embodiments of Present Invention

Three embodiments of this invention have been deployed in the field, with positive results:

The first embodiment uses a scanning radio for the purposes of discovery only and uses the uplink to perform the sampling of throughput performance by connecting to the downlink of each of the candidate parent mesh nodes.

The second embodiment eliminates the need for a scanning radio by using multiple downlinks on the fixed nodes and multiple uplinks on the mobile node, each fixed to operate on a pre-assigned channel. The non-scanner case is relevant in cases where no discovery is needed or when the potential parent channels are set. This is described in a later section.

The third embodiment is a variation of the first, where, to save costs, the functionality of the scanning radio is incorporated into the mesh relay node. The uplink radio stops sending and receiving packets and packets are buffered. It then periodically scans the RF environment. The performance of the network is not significantly affected if the scanning time is kept low.

Field tests of this third embodiment were performed to test the overall performance of the network. Mesh nodes were mounted in army vehicles. When army vehicles form a convoy there is a string of pearls connectivity to a root node and satellite link. When the vehicles are not part of a convoy there is no mesh link but there is still a service radio so client laptops and client phones may pass messages on the mesh node's local hard drive for future transmission. There is a GPS radio installed inside each mesh node, all messages are time and location stamped. When the mobile units are not connected to a mesh network they act as temporary mailboxes, storing information and queries for onward transmission. When the vehicle makes contact with other vehicles it forms a peer-to-peer mesh and data is synchronized so mesh nodes that connected with each other now have a consolidated database of messages transmitted to individual mesh nodes. The consolidated database is uploaded when a mesh is formed or when any one of the vehicles reach the base. The mesh nodes form a mobile time delayed store and forward messaging system. It was found that the overall performance loss—without using a dedicated scanning radio—was less than 2 percent.

In another set of field tests, mesh nodes were deployed in underground mine tunnels. One set of mesh nodes formed a static string of pearls along the mining tunnel wall. Mobile mesh nodes were mounted on trolleys that moved along the tunnel. Miners with VoIP phones were able to connect to the network without significant packet loss.

In the applications described above, the mobile nodes were moving at less than 50 (fifty) miles per hour (mph). As the speed increases, more scanning time is needed to collect enough samples of data to make an informed decision regarding the best next parent. Spending more time on sampling/scanning detracts from the main task at hand for the relay nodes, namely the transfer of packets.

With a dedicated scanning radio in place, speeds of 100 (hundred) mph were achieved. In one field test, mesh nodes were placed along the side of the road, similar to what is shown in FIGS. 5 and 6. The mobile node, mounted on the car, traveled along the road. Switch over from one parent node (along the road) to the next one took place reliably and in a repeatable manner.

Methods and architectures for extending the functionality of multi-radio mesh systems for mobility have been described. Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for operating a mesh network having a plurality of mesh nodes, comprising:
for at least one mesh node of the mesh network, scanning a Radio Frequency (RF) environment using a dedicated scanning radio to determine a new potential parent mesh node for connecting with said at least one mesh node;
wherein said at least one mesh node includes, in addition to said scanning radio, at least two relay radios in each mesh element and wherein said scanning radio and said at least two relay radios operate on different non-interfering channels;
wherein said at least one mesh node is moving sufficiently rapidly that it may lose connectivity with its current parent mesh node, and wherein said dedicated scanning radio is utilized for discovery of potential new parent nodes and sampling of discovered potential new parent nodes is performed by an uplink relay radio of said at least one mesh node;
wherein while said at least one mesh node samples potential new parent nodes, packets to be sent to said at least one mesh node from its current parent node are buffered by the current parent node, and packets to be sent from said at least one mesh node to its current parent are buffered by said at least one mesh node; and
wherein sampling times are coordinated among multiple mesh nodes having a common current parent node whereby the common current parent node sends tokens to each of its children in a round-robin manner.

2. A mesh network comprising:
a plurality of mesh nodes; wherein
at least one mesh node of the mesh network is configured to scan a Radio Frequency (RF) environment using a dedicated scanning radio to determine a new potential parent mesh node for connecting with said at least one mesh node; wherein
said at least one mesh node includes, in addition to the scanning radio, at least two relay radios in each mesh element and wherein said scanning radio and said at least two relay radios operate on different non-interfering channels;
wherein while said at least one mesh node samples potential new parent nodes, packets to be sent to said at least one mesh node from its current parent node are buffered by the current parent node, and packets to be sent from said at least one mesh node to its current parent are buffered by said at least one mesh node;
wherein sampling times are coordinated among multiple mesh nodes having a common current parent node whereby the common current parent node sends tokens to each of its children in a round-robin manner.

3. A mesh network comprising:
a plurality of mesh nodes; wherein each node within said plurality of nodes comprises at least three radios further including:
a first relay radio operating on a first RF channel at a first point in time and dedicated to uplink connections to a single current parent node;
a second relay radio operating on a second RF channel at a first point in time and dedicated to downlink connections to zero or more child nodes; and
a dedicated scanning radio operating on a third RF channel at a first point in time and configured to scan a Radio Frequency (RF) environment to discover new potential parent mesh nodes for connecting with said first relay radio; wherein
said first, second, and third RF channels are different from each other
wherein after said dedicated scanning radio discovers a potential new parent node, said first relay radio samples the RF link to said potential new parent node using its uplink radio and concurrent with said sampling, packets to be sent to the mesh node from its current parent node are buffered by the current parent node, and packets to be sent from the mesh node to its current parent node are buffered by the mesh node
wherein sampling times are coordinated among multiple mesh nodes having a common current parent node whereby the common current parent node sends tokens to each of its children in a round-robin manner.

* * * * *